United States Patent Office 3,144,432
Patented Aug. 11, 1964

3,144,432
POLYCARBONATE POLYMERIZATION PROCESS
Daniel W. Fox, Pittsfield, Mass., assignor to General
Electric Company, a corporation of New York
No Drawing. Filed Aug. 18, 1961, Ser. No. 132,317
4 Claims. (Cl. 260—47)

This invention relates to a process for the preparation of linear aromatic carbonate polymers, and in particular to a process which involves a simplified method of treating the reaction mixture after polymerization of the carbonate polymer has been completed.

Among the known processes for the preparation of linear aromatic carbonate polymers is the passing of phosgene into a pyridine solution of the aromatic compound. Pyridine has considerable merit in the solvent polymerization of such polymers because it simultaneously acts to catalyze the reaction, acts as an acid acceptor for the hydrochloric acid given off during the reaction, and, in addition is an excellent polymer solvent. The foregoing process has therefore been used to prepare polymers having satisfactory properties.

However, the practical production of such polymers involves considerations in addition to polymer properties. Polymer separation and purification and solvent recovery should be relatively easily and economically carried out. In order to enable a process to be commercially practical, it is usually considered necessary to recover as much as 98 percent or more of the solvent used in the polymerization reaction. Such solvent recovery is achieved only with difficulty in the foregoing pyridine process. Moreover, pyridine is a costly solvent and this has served to emphasize the recovery problem. Other less expensive diluent solvents have been used or suggested for use in combination with pyridine to reduce costs. They have not, however, simplified problems of polymer and solvent separation and recovery.

It is therefore a primary object of the present invention to provide a simplified and more economical process for the preparation of linear aromatic carbonate polymers.

It is a further object of this invention to prepare such polymers by a process involving a considerably improved means of separation, purification and recovery of reaction products, solvents and by-products.

Generally speaking, the process of the present invention involves the passing of a carbonyl halide into a solution of chlorobenzene, pyridine and a dihydric phenol to form a reaction mixture containing the aromatic carbonate polymer, chlorobenzene and pyridine hydrochloride. Ninety-five percent or more of the crystalline pyridine hydrochloride is then relatively easily separated from the reaction mixture. The remainder of the reaction mixture containing the polymer dissolved in a pyridine hydrochloride saturated solution of chlorobenzene is concentrated by distillation to remove substantially all of the residual pyridine hydrochloride. The polymer is then separated from the chlorobenzene by any one of a number of known techniques.

A major reason for the significant advantages of the present process results from the fact that chlorobenzene has been found to be almost a complete non-solvent for the principal by-product of the polymer reaction, namely, pyridine hydrochloride. The insolubility of pyridine hydrochloride in chlorobenzene results in the relatively easy separation (as for example, by filtration) of over 95 percent of the pyridine hydrochloride formed during the reaction. As a further result of such insolubility, near stoichiometric proportions of reactants may be used. There appears to be sufficient driving force for the reaction to go to completion in a short period of time without the use of excess reactants. This driving force is believed to result from the immediate precipitation of pyridine hydrochloride which forces the reaction forward by effectively removing one of the reaction products.

It should be noted, however, that it is not sufficient to have a solvent in which the pyridine hydrochloride solubility is low. For example, pyridine hydrochloride is relatively insoluble in benzene, a close homologue of chlorobenzene. However, when benzene was tried as a solvent, the initially formed phosgene-pyridine (or phosgene-pyridine-dihydric phenol) complex precipitated and failed to react in a reasonable period of time, perhaps due to the low solubility of the phosgene complex in benzene. Considerable heating and stirring of the mixture resulted in an uncontrollable exothermic reaction. Dichlorobenzene has a boiling point which is too high to enable its easy removal by distillation. Xylene, on the other hand, is a relatively poor solvent for the polymer.

An additional advantage of chlorobenzene resides in the fact that at its nominal boiling point of 132° C., pyridine hydrochloride has an appreciable vapor pressure. Thus, if one starts with a cold chlorobenzene solution saturated with pyridine hydrochloride and proceeds to heat it to the boiling point, the initial vapor or distillate will be richer in pyridine hydrochloride than the solution. The net result is that the pyridine hydrochloride can be distilled out of a saturated solution at a faster proportionate rate than chlorobenzene. Whether the pyridine hydrochloride distills as a compound or first dissociates into pyridine and hydrogen chloride which recombines in the condenser is not known. The fact remains that the initial distillate is sufficiently rich in pyridine hydrochloride to cause a separation of solid pyridine hydrochloride from the chlorobenzene. In a typical experiment, it was found that 96 percent of the pyridine hydrochloride was removed from a saturated chlorobenzene solution by distilling off 50 percent of the chlorobenzene. In effect, a unique combination of properties exists with respect to chlorobenzene, making the present process possible.

In carrying out the polymerization reaction, phosgene as the carbonyl halide is passed into a solution of the dihydric phenol, pyridine and chlorobenzene. It is, of course, possible to use two or more different dihydric phenols if a copolymer rather than a homopolymer is desired. It is also possible that other solvents or catalysts may be added without departing from the scope of the invention, although no additional solvents or catalysts are ordinarily necessary or desirable. The reaction time may vary from a few minutes to a few hours depending on the particular polymer prepared, the degree of polymerization desired and the choice of other reaction conditions. The temperatures can similarly vary widely, although room temperatures to 75° C. have been found to be advantageous.

The quantity of chlorobenzene used in the polymerization process is not critical. It is only necessary that a sufficient amount of chlorobenzene be added to enable the precipitated pyridine hydrochloride to be separated from the reaction mixture at the conclusion of the reaction. This amount will be dependent on the polymer product desired and on the temperature and manner in which separation is effected. The higher the intrinsic viscosity of the polymer, the greater the proportion of solvent necessary. For example, a 10 to 20 percent, by weight, solution of resin in chlorobenzene may be used if the polymer is to have an intrinsic viscosity of 0.4 to 0.7 (intrinsic viscosity as used herein is measured in deciliters per gram at 25° C.). If the polymer is to have an intrinsic viscosity of 1.0 or higher, a concentration of 10 percent or lower might be desirable. Similarly, a solution too viscous to filter at room temperature may be sufficiently fluid to be filtered at higher temperatures. Centrifugal separation of pyridine hydrochloride may be possible with mixtures too viscous to separate by filtration. Ordinarily, sufficient chlorobenzene is used to end up with a 5–20 percent solution of polymer in chlorobenzene or from about five to twenty times, by weight, as much chlorobenzene as dihydric phenol.

The quantity of pyridine used may vary from approximately 98 percent of theory to a fairly large excess based upon the quantity of the dihydric phenol employed. A preferred upper range for the quantity of pyridine is 102 percent of theory. Although larger excesses may be used, they are neither necessary nor desirable from the standpoint of economy. The quantity of carbonyl halide used should be less than or substantially equivalent to the quantity of dihydric phenol, and is preferably less than equivalent to the quantity of pyridine. Theoretically, one mole of phosgene reacts with one mole of the dihydric phenol producing the polymer and two moles of HCl. The HCl in turn forms pyridine hydrochloride with two moles of pyridine. The foregoing are herein referred to as stoichiometric or theoretical amounts.

It is desirable to use an equivalent or slightly less than equivalent quantity of phosgene (or other carbonyl halide) to prevent the formation of polymer chains with chloroformate end groups. In the event, however, that the phosgene endpoint is overrun, the chloroformate end groups may be removed (and incorporated into the polymer chain) by adding small amounts of the dihydric phenol-chlorobenzene-pyridine solution. Alternatively, a small excess of a monofunctional phenol or alcohol can be added to the reaction mixture to terminate the chains with nonhydroxy-containing groups.

After the polymerization reaction is completed, 95 percent or even more of the formed pyridine hydrochloride will have precipitated and be in crystalline form. It may be readily filtered from the solution of polymer and chlorobenzene. It is also possible to separate the pyridine hydrochloride by heating the solution until the pyridine hydrochloride melts and separates as the heavy phase. Upon cooling, the pyridine hydrochloride solidifies and the chlorobenzene-polymer solution phase may be decanted. At this point, there will remain only a very small proportion of pyridine hydrochloride in the polymer solution because of its low solubility in the chlorobenzene (about 0.03 to 0.04 g./100 g. of chlorobenzene). The filtrate or decanted layer containing the polymer in chlorobenzene solution is then concentrated by distillation. Because chlorobenzene has an appreciable vapor pressure at the boiling point of chlorobenzene, this small amount of residual pyridine hydrochloride may be substantially removed by distilling approximately one half of the solvent. The pyridine hydrochloride will distill off at a comparatively faster rate than the chlorobenzene. The first portion of the condensate will readily separate into two phases again, one being solid pyridine hydrochloride, and the other chlorobenzene saturated with pyridine hydrochloride. By simply continuing this process of distillation, the pyridine hydrochloride content of the resin solution may be distilled to any desired low level of pyridine hydrochloride content.

If desired, the filter cake from the filtration step (or solid layer remaining after decanting) may be repeatedly washed with chlorobenzene (saturated with pyridine hydrochloride from the distillation step) to separate and remove any remaining carbonate polymer. This wash solution may be combined with the polymer solution for distillation removal of pyridine hydrochloride. The entire process may be made continuous by utilizing either fresh chlorobenzene or recycling chlorobenzene from which the pyridine hydrochloride has been removed.

Separation of the polymer from the chlorobenzene solvent may be accomplished in a number of ways, as by precipitation by the addition of analiphatic hydrocarbon non-solvent such as pentane, hexane, heptane and mixed petroleum spirits with boiling points sufficiently different from chlorobenzene to enable easy separation by distillation or an aliphatic alcohol non-solvent such as methanol, ethanol, isopropanol or n-propanol, or the solution may simply be evaporated to dryness.

The following examples will illustrate in greater detail the practice of the present invention.

*Example 1*

Five hundred and seven grams (2.22 moles) of Bisphenol-A (2,2-bis-(4-hydroxyphenyl)-propane) were dissolved in 4,700 ml. of chlorobenzene (about a 10:1 weight ratio of Bisphenol-A to chlorobenzene). Solution was effected by heating the solvent to its boiling point. Approximately 100 ml. of the solvent were distilled to azeotropically remove traces of moisture. The solution was then cooled to 100° C. and 355.5 grams (4.50 moles) of pyridine were added. The solution was then cooled to 45° C. and 218 grams (2.20 moles) of phosgene were added over a 1½ hour period. The temperature during the addition of phosgene varied between 45° C. and 60° C. At the conclusion of the reaction, the contents of the reaction flask were cooled to about 40° C. and filtered with vacuum. The filter cake was washed with several 200 ml. portions of chlorobenzene. The filter cake wash solutions were combined with the original filtrate.

A portion of the combined filtrate (water-white and transparent) was transferred to a beaker equipped with an efficient stirrer. The resin was precipitated by adding 2 volumes of isopropanol. The precipitated resin was recovered by filtration and the filtrate was tested for chloride ion by adding isopropanol containing silver nitrate solution. The test for chloride ion was positive.

The remainder of the resin solution was concentrated by boiling off approximately one half of the chlorobenzene solution. A portion of this concentrate was precipitated with isopropanol. The filtrate in this case gave negative chloride test. The remainder of the resinous polymer was precipitated by adding n-hexane to the stirred concentrated solution. The polymer was recovered by filtration and dried overnight at 125° C. The intrinsic viscosity determined in dioxane solution was 0.67. The isopropanol precipitated material from the first test precipitation above had an intrinsic viscosity which was essentially the same. The resin was both compression and injection molded into physical test specimens. The color of the molded parts was exceptionally light.

*Example 2*

A feed solution was made up containing the following proportion of materials:

456 g. (2 moles) of Bisphenol-A
4500 ml. chlorobenzene
320 g. (4.00 moles) of pyridine The reactor was a 3″ x 3′ glass tube with two inlets at the bottom. A central stirring shaft was provided with three baffle plates and three stirrers. This arrangement resulted in three consecutive reaction chambers provided with agitators and a top chamber containing an overflow tube.

The feed solution and phosgene were metered into the bottom chamber where the bulk of the reaction took place. Fresh feed forced the reaction mixture to move slowly up the column and pass out of the overflow through a filter and finally to a receiver. The volume of the reactor and feed rate resulted in dwell times of about one hour ±15 minutes. A number of fractions were collected with variations in feed and phosgene rates and proportions. Final treatment and solid resin recovery were similar to that described in Example 1. Intrinsic viscosities of the various cuts varied from 0.66 to 0.96.

Example 3

A solution was prepared from the following materials:

228 g. (1.0 mole) Bisphenol-A
158 g. (2.0 moles) pyridine
2280 g. chlorobenzene

Phosgene was added to a well-stirred 700 ml. portion of the above described solution. An excess of phosgene was used. The resulting reaction mixture was filtered and divided into several aliquot portions. These were then back titrated by adding portions of the original stock solution until further addition failed to produce further pyridine hydrochloride precipitation. Two of the samples were checked for intrinsic viscosity and had an intrinsic viscosity of 0.58 and 0.54 respectively.

Example 4

A resin solution was prepared as in Example 1 and divided into three portions after the initial filtration.

Portion 1 was precipitated and washed with isopropanol.

Portion 2 was precipitated and washed with n-hexane.

Portion 3 was precipitated with n-hexane after distilling off an equivalent volume (fresh chlorobenzene was added to maintain original volume) of chlorobenzene for pyridine hydrochloride removal.

The intrinsic viscosities of the three samples, dried overnight at 125° C., were 0.76, 0.76 and 0.78 respectively. On heat aging compression molded pieces of the three resins, it was found that the third sample, prepared by distillation and removal of pyridine hydrochloride, maintained its original light color for a longer period of time than the other two samples.

Example 5

The following experiments were conducted in order to measure the solubility of pyridine hydrochloride in chlorobenzene and to determine the amount of pyridine hydrochloride removed from a saturated solution by distilling one half the solvent.

Several grams of pyridine hydrochloride (anhydrous) were added to 500 grams of boiling chlorobenzene. Approximately 100 grams of chlorobenzene were distilled from the well-stirred mixture to provide for azeotropic drying of the solution and to insure saturation with pyridine hydrochloride. The mixture was then cooled to room temperature, filtered to remove residual undissolved pyridine hydrochloride and aliquots were titrated with standard base, after adding water. The solubility of pyridine hydrochloride in chlorobenzene was found to be 0.35 g./liter, or about 0.03 g./100 g.

An aliquot of the pyridine hydrochloride saturated chlorobenzene solution prepared as above was distilled until one half of the chlorobenzene was removed. The residual solution was titrated with standard base. The pyridine hydrochloride content was found to be 0.023 g./liter or 0.002 g./100 g. The distillate was composed of two distinct phases: solid crystalline pyridine hydrochloride, and a saturated solution of pyridine hydrochloride in chlorobenzene.

The linear aromatic carbonate polymers which may be prepared in accordance with the practice of the present process are in general those in which carbonate groups are attached directly to a nuclear carbon atom of the aromatic radical of the dihydric phenol. They may be typified as having repeating structural units of the formula

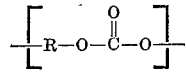

where R is the aromatic radical of the dihydric phenol. The dihydric phenols are mononuclear or polynuclear aromatic compounds containing, as functional groups, two hydroxyl radicals each of which is attached directly to a carbon atom of an aromatic nucleus. Typical dihydric phenols are hydroquinone; resorcinol; 2,2-bis-(4-hydroxyphenyl)-propane; bis-(p-hydroxyphenyl)-sulfone; and p,p'-dihydroxydiphenyl ether. A large number of additional dihydric phenols useful in the present invention are disclosed in U.S. Patent 2,999,835 whose issue date is September 12, 1961. The latter patent also describes in greater detail the structure of the linear aromatic carbonate polymers.

What I claim as new and desire to secure by Letters Patent of the United States is:

1. A process for the preparation of linear aromatic polymers comprising (1) passing a carbonyl halide into a solution comprising a dihydric phenol, chlorobenzene and pyridine to form a reaction mixture containing pyridine hydrochloride and a solution of the carbonate polymer in chlorobenzene, substantially all of the pyridine hydrochloride being present as a precipitate, (2) separating the precipitated pyridine hydrochloride from the reaction mixture, (3) distilling the solution of the carbonate polymer in the chlorobenzene to remove substantially all residual pyridine hydrochloride, and (4) separating the carbonate polymer from the chlorobenzene.

2. The process of claim 1 in which the dihydric phenol is 2,2-bis-(4-hydroxyphenyl)-propane.

3. A process for the preparation of linear aromatic polymers comprising (1) passing a carbonyl halide into a solution comprising chlorobenzene, a dihydric phenol and pyridine, the carbonyl halide, dihydric phenol and pyridine being used in substantially stoichiometric amounts, to form a reaction mixture containing pyridine hydrochloride and a solution of the carbonate polymer in chlorobenzene, substantially all of the pyridine hydrochloride being present as a precipitate, (2) separating the precipitated pyridine hydrochloride from the reaction mixture, (3) distilling the solution of the carbonate polymer in the chlorobenzene to remove substantially all residual pyridine hydrochloride, and (4) separating the carbonate polymer from the chlorobenzene.

4. A process for the preparation of linear aromatic polymers comprising (1) passing a carbonyl halide into a solution comprising a dihydric phenol, chlorobenzene and pyridine to form a reaction mixture containing pyridine hydrochloride and a solution of the carbonate polymer in chlorobenzene, substantially all of the pyridine hydrochloride being present as a precipitate, (2) separating the precipitated pyridine hydrochloride from the reaction mixture, (3) distilling the solution of the carbonate polymer in the chlorobenzene to remove substantially all residual pyridine hydrochloride, and (4) separating by precipitation the carbonate polymer from the chlorobenzene by the addition of a polymer non-solvent to the polymer solution.

References Cited in the file of this patent

UNITED STATES PATENTS

| | | |
|---|---|---|
| 3,014,891 | Goldblum | Dec. 26, 1961 |
| 3,022,271 | Darr et al. | Feb. 20, 1962 |
| 3,046,255 | Strain et al. | July 24, 1962 |

OTHER REFERENCES

General Electric Co. Chemical Engineering, Nov. 14, 1960, pp. 174–177.